May 23, 1967 P. DE PAOLIS ET AL 3,321,316
METHOD OF PACKAGING AND TREATING EGGS
Filed Aug. 3, 1964 2 Sheets-Sheet 1
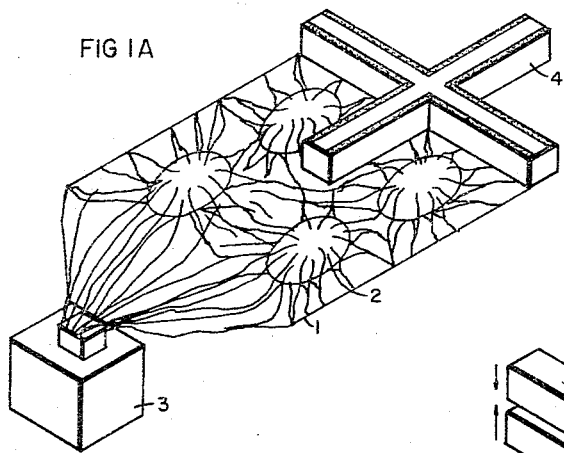
FIG IA
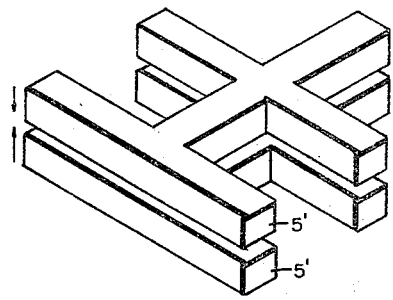
FIG 2A
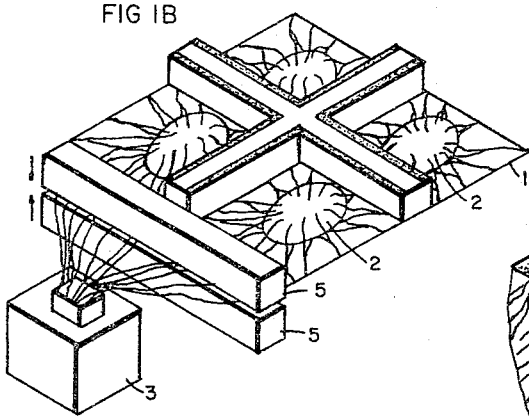
FIG IB
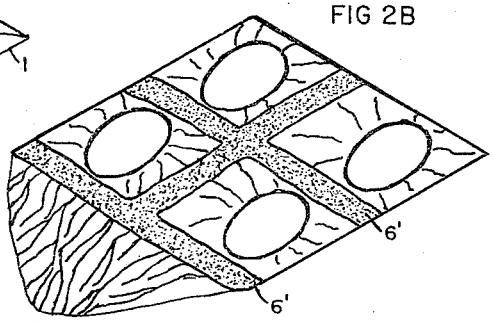
FIG 2B
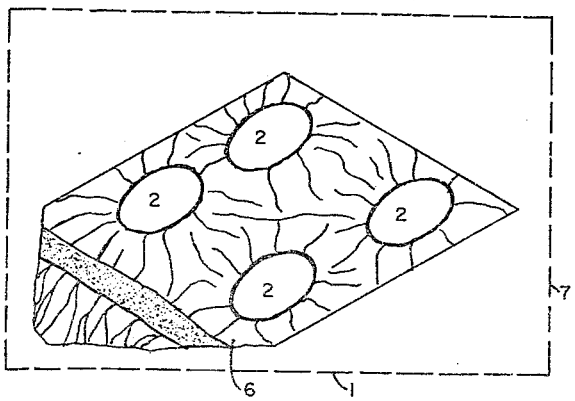
FIG IC
*INVENTORS*
Potito dePaolis
Frank V. Kosikowski
BY
*Ralph R. Barnard*
THEIR ATTORNEY

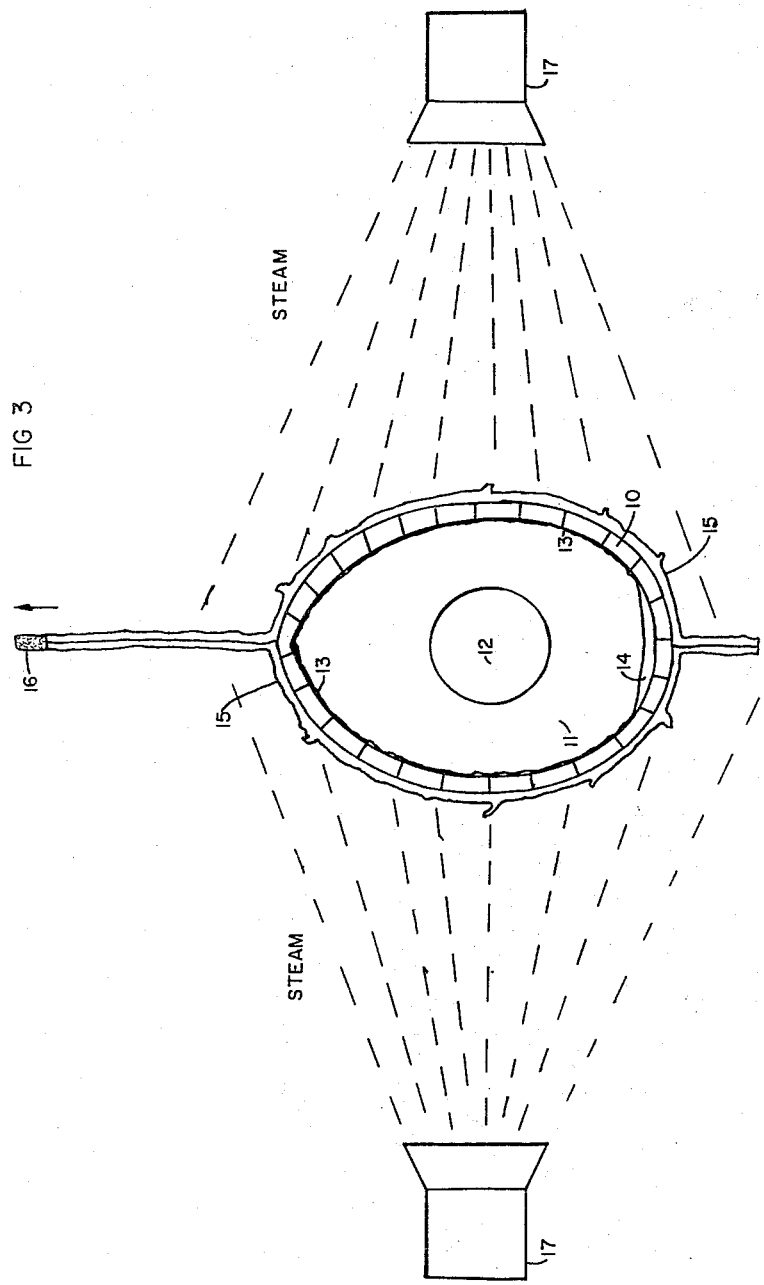

United States Patent Office 3,321,316
Patented May 23, 1967

3,321,316
METHOD OF PACKAGING AND TREATING EGGS
Potito de Paolis and Frank V. Kosikowski, Ithaca, N.Y., assignors to Cornell Research Foundation, Inc., Ithaca, N.Y., a corporation of New York
Filed Aug. 3, 1964, Ser. No. 386,898
6 Claims. (Cl. 99—177)

ABSTRACT OF THE DISCLOSURE

A method of packaging plural food articles such as eggs involving in steps of first placing the plural food articles within a bag of flexible material which is nonpermeable to air; then placing a separator means on the outside of the bag between the plural food articles for physically preventing any of the plural food articles from coming into physical contact with another of the plural food articles; quickly evacuating the air from said bag to a degree of a substantial vacuum so that the flexible material is stressed into close physical hugging relationship around each of the plural food articles with the separator means preventing each of the food articles from being forced against one another within the bag during the air evacuation step. By applying steam to an egg or plural eggs encapsulated as aforesaid for a limited time period, the bacteria including pathogens therewithin may be killed or destroyed without coagulating the albumen of the egg.

---

This invention relates generally to eggs and more particularly to the packaging of eggs in a manner to extend the keeping qualities of the eggs and to the treatment of eggs for microbial destruction.

The invention described herein was made in the course of, or under, a grant or contract with the United States Department of Health, Education and Welfare.

Many eggs are produced, distributed and consumed throughout the world each year. The keeping quality problems associated with the time lag between the production of eggs and their distribution and consumption have been and still are formidable. More specifically the keeping qualities of eggs may be divided into two categories (1) the eatability characteristics and (2) the fertility and hatchability characteristics. In the past, the keeping qualities of an egg with respect to its fertility and hatchability have been of a very short duration. Moreover, the keeping qualities of an egg with respect to its eatability while considerably longer have also been as a practical matter much too short with regard to an optimum freedom in the distribution and consumption of eggs for food purposes.

Many techniques have been resorted to to extend the keeping qualities of eggs. Of the prior art techniques that have had any measure of success in extending the keeping qualities of eggs, they would all appear to have shortcomings of one or more of the following types:

(A) The technique significantly increases the cost of packaging eggs.

(B) The technique has no significant capability in extending the fertility or hatchability of the egg.

(C) The technique subjects the egg to foreign odors adversely affecting their marketability.

(D) The technique involves modifying the whole shell egg to an unnatural form (i.e. removing the shell, etc.).

(E) The technique involves the addition of $CO_2$ to the egg package in a manner which is time consuming, expensive and corrosive to the equipment.

A co-pending patent application entitled "Method of Packaging Eggs" application No. 384,907 filed July 24, 1964, Frank V. Kosikowski inventor, and assigned to the same assignee as the present application, discloses a new method and package for an egg which overcomes each of the aforementioned shortcomings. The teachings of the aforementioned prior patent application involve the following steps: The egg to be packaged is placed in a pouch or bag of flexible material where said material is relatively nonpermeable to air. The pouch (or bag) of flexible material is then attached to a vacuum apparatus which is capable of producing a substantially high vacuum within the flexible material so that it is stressed into close hugging relationship with the egg. The flexible material is then sealed to the atmosphere. The rapidity with which the substantial vacuum within the flexible nonpermeable material can be obtained is very important to the keeping qualities of the egg. By packaging an egg in accordance with the teachings of the aforementioned patent application, the following advantages accrue:

(1) The packaging cost is very low.

(2) The eatability keeping qualities of the egg are extended over a substantial period of time.

(3) The fertility and hatchability keeping qualities of the egg are extended over a substantial period of time.

(4) The packaging operation is not time consuming, nor is it corrosive to the packaging equipment.

(5) The process of extracting the air from the flexible packaging material functions to cull out those potentially non-safe eggs which have even the most minute crack in the shell since the existence of a crack will result in the egg notwithstanding the forces created by the air evacuation step.

Notwithstanding the many benefits of the teachings of the aforementioned prior patent application, two areas of improvement with respect to the packaging and handling of eggs are not taught by the aforementioned patent application. The first area relates to the fact that when plural eggs are packaged in a single pouch in accordance with the aforementioned prior patent application, the vacuum forces (which are important to create the close hugging relationship between the flexible material and the shell of a single egg and also to cull out those eggs which were initially in a cracked condition), are also sufficient to force each egg of the plural eggs within a single bag or pouch against one another with such force that the plural eggs were cracked or broken during the air evacuation step.

Moreover, while the packaging of an egg in accordance with the teachings of the prior patent application identified hereinabove (by the flexible non-permeable material in close hugging relationship to the shell) creates an effective barrier to the communication of gases, bacteria and substances through the shell so as to extend the keeping qualities of the egg and prevents mold growth, nothing in the packaging process is effective to kill the spoilage bacteria and pathogens likely to be encountered in the egg being packaged.

Techniques designed for killing bacteria and pathogens within eggs are not new. Considerable work has been done in this technical area. The processes used have sometimes been known as pasteurization and other times have been known as flash heating. One technique in the prior art has been to place an egg to be treated in oil for a period of about 10 minutes where the oil is at a temperature of around 145 degrees Fahrenheit. Other techniques have included removing the shell and heating the egg as a flowable liquid or as a dry powder. Each of these prior art techniques have had one or more of the following shortcomings:

(1) The heat treating or pasteurization technique is not effective to kill the bacteria in the egg particularly in the centermost part of the egg, the yolk.

(2) The technique results in some degree of coagulation of the albumen of the egg causing it to be unnatural in its use as a food product.

(3) The removal of the shell and reducing the egg to liquid or powdered form reduces the saleability of the product to the consumer.

(4) The technique is essentially a costly one adding substantial cost to the resale price of the egg.

Accordingly, it is therefore a primary object of the teachings of the present invention to provide a new and improved package and method for packaging plural eggs in a manner to extend their keeping qualities and a method of treating an egg for microbial destruction purposes.

It is another object of the teachings of the present invention to provide a new and improved package and method for packaging plural eggs to extend their keeping qualities in a manner which is of low cost.

It is another additional object of the teachings of the present invention to provide a new and improved package and method for packaging plural eggs to extend their keeping qualities in a manner which is not time consuming or corrosive to the packaging equipment.

It is still another object of the teachings of the present invention to provide a new and improved package and method of packaging plural eggs to extend their keeping qualities as to eatability and safety.

It is still another object of the teachings of the present invention to provide a new and improved package and method of packaging plural eggs which will extend their keeping qualities with respect to fertility and hatchability.

It is still another object of the teachings of the present invention to provide a new and improved method for packaging plural eggs which inherently tests each egg for cracks thereby culling those eggs which will be subject to bacteria attacks during storage leading to health problems such as food poisoning known as Salmonella.

It is an additional object of the teachings of the present invention to provide a new and improved method for packaging eggs which extends their keeping qualities and at the same time allows for unpackaging a single egg at a time with the remaining eggs within the package continuing to have the benefits of the original package.

It is still another object of the teachings of the present invention to provide a new and improved method of treating pre-packaged eggs so that spoilage bacteria and pathogens likely to be encountered within the egg will have their numbers substantially reduced.

It is still another object of the teachings of the present invention to provide a new and improved means for heat treating or pasteurizing eggs which is of low cost and not time consuming.

It is an additional object of the teachings of the present invention to provide a new and improved method for heat treating eggs to kill spoilage bacteria and pathogens within the egg in a manner so as to reduce substantially their numbers without coagulating the albumen or removing the shell of the egg.

Briefly, these and other objects of the teachings of the present invention are accomplished by packaging plural eggs in a substantially high vacuum environment. Specifically, the plural eggs to be packaged are placed within a pouch or bag of flexible material where said material is relatively non-permeable to air, a separator grid is placed over the plural eggs on the outside of said bag or pouch. The pouch or bag of flexible material is then attached to a vacuum apparatus which will evacuate the air within the bag to a degree measuring a substantially high vacuum within the flexible material so that the flexible material is stressed into close hugging relationship with each egg with the separator grid functioning to keep one egg from being forced against the other. The flexible material is then sealed to the atmosphere. The sealing may be done around the perimeter of each egg or groups of plural eggs. The rapidity with which the substantial vacuum within the flexible non-permeable material can be obtained is very important to the keeping qualities of each of the plural eggs. With the flexible non-permeable material being in close hugging relationship with each of said eggs, each or all of said eggs may be heat treated for the purpose of killing spoilage bacteria and pathogens within the egg by the application of steam for a selected short period of time directed to the non-permeable material entirely surrounding each egg. The steam at a selected pressure may be applied for a selected short time period by one or more steam jets located at a selected distance from each encapsulated egg. The selected steam pressure at the jet, the selected short time period of application and selected distance is determined so that the heat energy passing into said egg when considered in terms of the environment within said egg will not cause coagulation of the albumen of said egg but will kill substantially all of the spoilage bacteria and pathogens likely to be encountered within the egg.

Other objects of the present invention will be apparent to those skilled in the art upon study of the accompanying disclosure and drawings in which:

FIGURES 1A, 1B and 1C depict application of a substantially high vacuum packaging to plural eggs in accordance with the teachings of the present invention.

FIGURES 2A and 2B show one of the many variations of sealing arrangements which may be used when practicing the teachings of the present invention wherein each egg within the package is separately sealed, and FIGURE 3 depicts the heat treating of a packaged egg in accordance with the teachings of the present invention.

Referring now to FIGURE 1A there is shown a bag or pouch 1 in which are placed four (plural) eggs 2. The mouth or entrance to the bag or pouch 1 is connected in a conventional manner with a vacuum unit 3. Separator grid 4 shown in FIGURE 1A as remote from the bag is then placed on the outside of the bag in the manner shown in FIGURE 1B. When the separator grid is placed as shown in 1B, each egg is restrained from being forced against another egg when vacuum pump 3 commences to evacuate the air from the bag or pouch made of flexible material which is non-permeable to air. The separator grid 4 can be made of a variety of materials providing substantial rigidity with flexible edge portions adjacent to the eggs, and has the only limitation that when placed on the outside of the bag for purposes of separation during the evacuation step, that it not be applied with such pressure that there is no undue restriction in the communication of air between the portions of the bag containing the plural eggs. Finally, after the air within the bag is evacuated to a degree of a substantially high vacuum, sealing bars 5 are moved together against the egg for the purpose of sealing the entrance to the bag. Within the teachings of the present invention the sealing of the bag may be accomplished in a variety of ways, however, one method which has been used successfully is of the heat sealing type. The heating and movement of the sealing bars 5 can be accomplished in a conventional manner.

FIGURE 1C shows the bag or pouch 1 removed from the vacuum pump 3 and sealed along a line 6. Because of the extraction of the air from within the bag to a degree of a substantial vacuum the non-permeable flexible material is shown in FIGURE 1C in close hugging relationship with each of the plural eggs. In keeping with the description contained in the above identified co-pending application, the package of plural eggs may then be placed in a controlled environment 7 with a temperature range of 35 to 50 degrees Fahrenheit and a relative humidity range of 85 to 90 percent, wherein its keeping qualities may be extended through a substantial period as to eatability and fertility and hatchability.

While four eggs are shown in FIGURE 1 being packaged in accordance with the teachings of the present invention, it should be clear that the same teachings may be applied to any number of eggs including a half or a whole dozen. As in the aforementioned prior patent application the relatively high or substantially high vacuum as used in describing the teachings of the present invention is that degree of vacuum which will create sufficient forces causing the non-permeable flexible material to cling to the shell of the egg despite the tendency for oxygen and $CO_2$ to seep through the shell. It may be generally stated that the higher the vacuum used the better the results from the teachings of the present invention. As an example, a vacuum of 750 mm. mercury (or 29.5 inches) gives excellent results.

It may also be stated that the results from the teachings of the present invention are improved by increases by the non-permeability of the flexible material. An example of a type of bag which is both sufficiently non-permeable and flexible is one which is double layered and laminated with cellophane and polyethylene. To a degree that it does not adversely affect critical flexibility, metal foil may be included.

As pointed out hereinabove, FIGURE 1C shows the pouch of flexible material 1 being sealed only at the entrance to the bag. Accordingly, the breaking of the seal to remove one of the eggs will effectively break the seal as to the other eggs. When such a condition is objectionable, the adjoining perimeter of each egg with respect to the other may be sealed by means similar to sealing bars 5 except they are positioned and formed in the manner of a grid. For example, alternative sealing bars 5 are shown in FIGURE 2A in the form of a grid. The use of such sealing bars would result in a sealing pattern as shown in FIGURE 2B so that each egg may be removed from the vacuum package individually without destroying the vacuum packaging of the remaining eggs of the total package. Such a sealing arrangement would be particularly beneficial when the vacuum packaging according to the teachings of the present invention resulted in the breakage of one or more eggs of a package by reason of the presence of cracks in the shell of those eggs (the culling operation referred to hereinabove). Since the sealing art is well developed, many variations of the sealing step may be utilized in keeping with the teachings of the present invention.

For example, a package containing a dozen eggs may be sealed in a manner that the vacuum package may be retained for six eggs after removing one vacuum section containing the other half of the package. It may also be that under certain conditions that it would be desirable for the separator grid (which must be somewhat flexible on its side portions) to also operate as the sealer during the sealing operation. It is emphasized, however, that when the separator grid is operating as a separator during the evacuation step it must not be pressed hard against the flexible material. This is because there must be some air communication between the portions of the bag containing each of the eggs and the entrance or mouth of the flexible material forming the pouch. On the other hand the bar or bars which function to seal must be pressed hard on the flexible material to perfect an adequate sealing to the atmosphere for the vacuum.

Notwithstanding the fact that the packaging of an egg in accordance with the teachings of the prior patent application identified hereinabove, and the packaging of plural eggs in accordance with the teachings of the present invention, creates (by the flexible non-permeable material in close hugging relationship to the shell) an effective barrier to the communication of gases, micro-organisms (i.e., bacteria) and substances through the shell so as to extend the keeping qualities of the egg, nothing in the packaging process is effective to kill the spoilage bacteria and the pathogens likely to be encountered in the egg being packaged.

It is also a part of the teachings of the present invention that the egg so packaged may be treated for the purpose of killing spoilage bacteria and pathogens likely to be encountered within the egg by the application of steam for a selected short period of time to the non-permeable material entirely surrounding each egg. The steam at a selected pressure may be applied for a selected short time period by one or more steam jets or nozzles located at a selected distance from each encapsulated egg. The selected steam pressure at the jet, the selected short time period of application, and the selected distance is determined so that the heat energy passing into said egg when considered in terms of the pressure within the said egg will not cause coagulation of the albumen of said egg but will kill substantially all the harmful bacteria and pathogens within the egg. For example, reference should be made to FIGURE 3. Therein is shown an egg packaged in accordance with the teachings of the present invention. The egg package may be transported by relative movement between two steam jets or nozzles 17 in a manner so that steam from the two jets 17 (at a selected pressure and at a selected distance from the packaged egg) is applied to the non-permeable material 10 covering the entire egg for a selected short time period. The rate of relative movement of the egg past the jets will determine the selected time period of the application of the steam. Although the relative movement of the egg past the jets may be somewhat intermittent, effectively the heat treatment of plural packages can be effected on a substantially continuous basis.

A simplified diagram of the egg is shown with the following identification numerals: the yolk is identified by numeral 12; the albumen is identified by numeral 11; the membrane is identified by numeral 13; the air cell is identified by numeral 14; the shell is identified by numeral 10; the non-permeable to air flexible material is shown in close hugging relationship with the egg and is identified by numeral 15; the flexible material is shown sealed at point 16.

Because the transference of heat to the egg is accomplished by the impingement of highly dense particles of steam on the egg hugging flexible material and that flexible material is non-permeable to air, heat is transferred through the flexible material into the egg via the shell without the passage of water particles within the package and the egg. It is important to the heat treating aspects of the present invention that the egg being treated be packaged in a non-permeable flexible material where the air has been extracted between the flexible material and the shell of the egg. This is true for at least two reasons. The first reason results from the fact that when the flexible material is so stressed into hugging relationship there is intimate contact between the flexible material and the shell which results in better heat transfer from the particles of steam evaporating on the surface of the flexible material. The second reason is that the extraction of the air to a degree measuring a substantial vacuum between the porous shell and the flexible material also draws some air through the shell causing the usually loose membrane 13 to hug the inner side of the shell 10 effecting a sealing of the shell causing it to be less porous. Thus when heat is applied to the shell of the egg via the hugging flexible material the egg is effectively a closed volume. Under these conditions, heat energy of a level available from the steam is sufficiently great to substantially kill the bacteria within the egg and at the same time is not effective to cause coagulation of the albumen.

For example, if steam is applied by jets 17 of FIGURE 3, at approximately 220 degrees Fahrenheit at a pressure of 84 pounds per square inch over the entire surface of the encapsulated egg 10 (over a distance of 15 cm. from the jets 17 to the nearest point on the egg shell) for a short time period of about 25 seconds, the packaged egg after removal will be heat treated (pasteurized or sanitized) to a degree such that total bacteria counts indicate that at least 97 percent of the bacteria including spoilage bacteria have been killed. Also, counts for coliform bacteria appear negative after such treatment.

Experimental results from injection of *Salmonella enteriditis* within the yoke of the egg to the degree of 8 millions per milliliter of culture shows that heat treating according to the teachings of the present invention kills at least 80 percent of said Salmonella.

When an egg or plural eggs are packaged in accordance with the teachings of the prior patent application and the teachings of the present application and heat treated in accordance with the teachings of the present application, the bacterial count of a stored egg or eggs is reduced to a degree greater than that usually encountered in the pasteurization of eggs. The vacuum encapsulation sets up a barrier to bacteria attack from the outside. The heat treating kills the bacteria which may be within the egg. Of course, the fresher the egg at the time of packaging the more effective the heat treating will be in the killing of the bacteria including pathogens.

It should be understood that heat treating of a packaged egg or packaged plural eggs in accordance with the teachings of the present invention is subject to a considerable number of variations. For example, while two jets are shown in FIGURE 3, one jet could be used to apply steam to the flexible material on one side of the egg and then apply it to the flexible material on the other side of the egg. Moreover, by utilizing plural sources of steam, plural eggs within a particular package or plural packages may be heat treated simultaneously. Also there need be no relative movement between the sources of steam and the individual eggs within a package providing the application of steam can be initiated and cut-off to reasonably define the time period of the application of steam.

While the invention has been particularly shown and described with reference to preferred embodiments thereof, it will be understood by those skilled in the art that the foregoing and other changes in form and details may be made therein without departing from the spirit and scope of the invention.

What is claimed is:

1. The method of packaging plural eggs comprising the placing of plural eggs within a bag of flexible material which is non-permeable to air, placing a separator means on the outside of said bag between said eggs for physically preventing any of said plural eggs from coming into physical contact with another of said plural eggs, quickly evacuating the air from said bag to the degree of a substantial vacuum of about 29.5 inches of mercury so that said flexible material is stressed into close physical hugging relationship around each of said eggs, with said separator means preventing each egg from being forced against another during the evacuation step.

2. The method of packaging and storing plural eggs to extend the keeping qualities of said eggs comprising the placing of said plural eggs within a bag of flexible material which is non-permeable to air, placing a separator means on the outside of said bag physically preventing any of said plural eggs from coming into physical contact with another of said plural eggs, quickly evacuating the air from said bag so that said flexible material is stressed into close physical hugging relationship around each of said eggs, the degree of evacuation being measured as a substantial vacuum of about 29.5 inches of mercury which will create sufficient forces causing said nonpermeable flexible material to cling to the shell of said egg despite the tendency for oxygen and $CO_2$ to seep through the shell of said egg, sealing said bag to the atmosphere.

3. The method of pasteurization of eggs comprising placing an egg to be treated within a bag of flexible material which is non-permeable to air, quickly evacuating the air within the bag to the degree of a substantial vacuum of about 29.5 inches of mercury which will create sufficient forces causing said nonpermeable flexible material to cling to the shell of said egg despite the tendency for oxygen and $CO_2$ to seep through the shell of said egg, sealing said bag to the outside atmosphere, and applying a jet of steam to all of the surface of the flexible material compressed against the shell of said egg in a manner that the egg becomes pasteurized, killing bacteria including pathogenic organisms, the pressure of said steam jet and distance of said steam jet from said encapsulated egg being selected so that the heat passed into said egg will not cause coagulation of the albumen of said egg.

4. The method of treating eggs comprising placing an egg to be treated within a bag of flexible material which is non-permeable to air, quickly evacuating the air within the bag to the degree of a substantial vacuum of about 29.5 inches of mercury which will create sufficient forces causing said nonpermeable flexible material to cling to the shell of said egg despite the tendency for oxygen and $CO_2$ to seep through the shell of said egg, sealing said bag to the outside atmosphere, and applying plural jets of steam to all of the surface of the flexible material in close hugging relationship against the shell of said egg in a manner that the egg becomes pasteurized, killing bacteria including pathogenic organisms, the pressure of said steam jets and the distance of said steam jets from said encapsulated egg being selected so that the heat energy passed into said egg will not cause coagulation of the albumen of said egg.

5. The method of heat treating plural eggs comprising the placing of said plural eggs within a bag of flexible material which is nonpermeable to air, placing a separator means on the outside of said bag physically preventing any of said plural eggs from coming into physical contact with another of said plural eggs, quickly evacuating the air from said bag so that said flexible material is stressed into close physical hugging relationship around each of said eggs, the degree of evacuation being measured as a substantial vacuum of about 29.5 inches of mercury which will create sufficient forces causing said nonpermeable flexible material to cling to the shell of said egg despite the tendency for oxygen and $CO_2$ to seep through the shell of said egg, sealing said bag to the atmosphere, applying steam from plural jets to all of each encapsulated egg for a limited time period in a manner so that the bacteria including pathogens are killed therewithin, the pressure of said steam jet and the distance of said steam jet from said encapsulated eggs being selected so that the heat passed into said eggs will not cause coagulation of the albumen of the eggs.

6. The method of heat treating plural eggs comprising the placing of said plural eggs within a bag of flexible material which is nonpermeable to air, placing a separator means on the outside of said bag physically preventing any of said plural eggs from coming into physical contact with another of said plural eggs, quickly evacuating the air from said bag so that said flexible material is stressed into close physical hugging relationship around each of said eggs, the degree of evacuation being measured as a substantial vacuum of about 29.5 inches of mercury which will create sufficient forces causing said nonpermeable flexible material to cling to the shell of said egg despite the tendency for oxygen and $CO_2$ to seep through the shell of said egg, sealing said bag to the atmosphere, applying steam to all of each encapsulated egg for a limited time period in a manner so that the bacteria including pathogens are killed therewithin, the pressure of said steam jet and the distance of said steam jet from said encapsulated eggs being selected so that the heat passed into said eggs will not cause coagulation of the albumen of the eggs.

References Cited by the Examiner
UNITED STATES PATENTS 2,340,260  1/1944  Clunan _____ 99—177
3,214,221  10/1965  Finnegan _____ 99—171 X

OTHER REFERENCES

Chemical and Engineering News, Nov. 28, 1955, page 5226.

Fletcher, D. A., et al.: Poultry Science, 38, 106–111 (1959).

Reid, R. G.: Poultry Tribune, March 1961, p. 12.

A. LOUIS MONACELL, *Primary Examiner.*

L. M. SHAPIRO, *Assistant Examiner.*